A. J. ROUSSEY.
INFLATED TIRE.
APPLICATION FILED MAY 12, 1910.
999,402.
Patented Aug. 1, 1911.
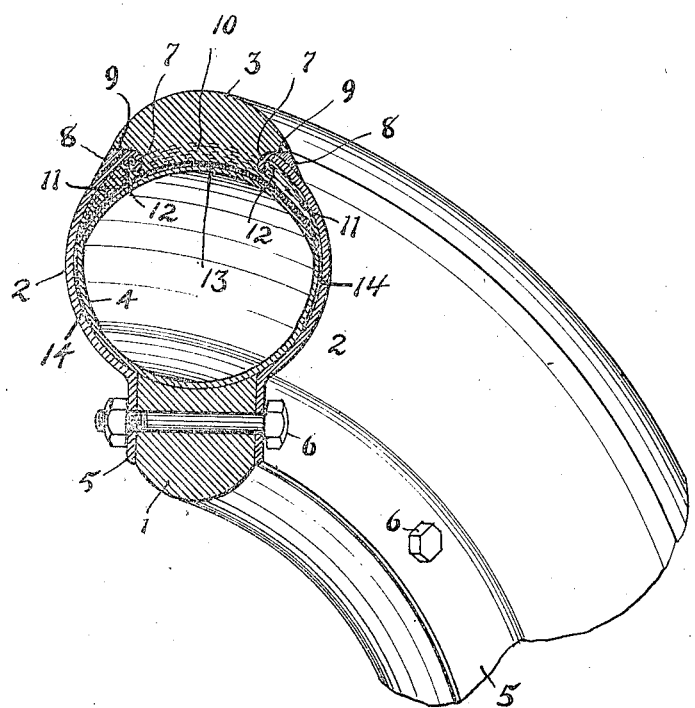

UNITED STATES PATENT OFFICE.

AMOS J. ROUSSEY, OF FORT WAYNE, INDIANA, ASSIGNOR OF ONE-THIRD TO WALTER F. McLALLEN, OF COLUMBIA CITY, INDIANA.

INFLATED TIRE.

999,402. Specification of Letters Patent. Patented Aug. 1, 1911.

Application filed May 12, 1910. Serial No. 560,846.

*To all whom it may concern:*

Be it known that I, AMOS J. ROUSSEY, a citizen of the United States of America, and resident of Fort Wayne, in the county of Allen and State of Indiana, have invented certain new and useful Improvements in Inflated Tires, of which the following is a specification.

This invention relates to improvements in inflated tires, and the objects thereof are to provide a tire so constructed that its tread will be supported in its approximate normal position in case the tire becomes deflated and thus prevent the deflated tube from becoming crushed; and to afford lateral retaining supports for the inflated tube so that its expanding force will become directed outwardly against the tread.

The objects of this invention are accomplished by the construction illustrated in the accompanying drawing which is a perspective view showing a section through the tire and corresponding part of the rim of the wheel to which it is attached.

With reference to the numerals marked upon the drawing: 1 is the rim of the wheel; 2 are oppositely disposed supporting shields; 3 the tread; and 4 the inflated tube. The shields are of metal, and each is of annular form, and convex upon its outer or exposed side and correspondingly concave upon its inner side. A flange 5 forms the inner periphery of each shield and fits against the rim of the wheel, and the shields are secured to the rim by transverse bolts 6 placed at intervals. At the outer periphery of each shield, upon the concave side thereof, is an annular back-turned flange 7, and upon the opposite side is a reinforcing fillet 8 which is also annular and presents a face 9 which forms the extreme outer edge of the shield. These fillets are brazed or welded in place upon their respective shields and are as integral parts thereof.

The shoe, or tread, 3, is of rubber construction with the inclusion of more or less reinforcing fabric 10, and has lateral wings 11 extending from its inner perimeter, each of which tapers outwardly to a thin edge. Each wing has an annular bead 12 that extends along adjacent its juncture line with the tread proper, and the bead is adapted to engage in the back-turned flange 7 of the corresponding shield 2 when the shoe is in place. A fabric strip 13 is vulcanized, or otherwise secured, to the inner face of the tread and adjacent wings and extends laterally beyond the outer edges of the wings so as to form flaps 14. The outer portion of the tread 3 is of greater circumference than the outer perimeters of the shields, and is of sufficient breadth to extend over and rest upon the faces 9 thereof. Also, the said outer portion of the tread is preferably softer than the inner part, the wings, especially the beads, being made comparatively harder.

The inflated tube 4 is of rubber and of similar construction to those ordinarily used in "inner-tube" pneumatic tires. When in place, and inflated, the tube holds the flaps and wings against the respective inner faces of the shields and presses outwardly against the tread, and thus securing the beads of the wings in connected relation with the corresponding in-turned flanges, and as the central part of the shoe is pressed outwardly, compressing the extending sides diametrically inward against the corresponding faces of the fillets.

Should the tube become deflated, the faces 9 of the shields will bear against the corresponding laterally extending sides of the outer portion of the tread, and thus the shields will carry the load without the aid of the inflated tube and save the tube from injury.

Having described my invention, what I claim as new and desire to secure by Letters Patent is:

In combination with a wheel rim, two oppositely disposed annular supporting shields secured at their inner edges respectively to said rim, and each having at its outer perimeter, upon the inner side thereof, a back-turned annular flange, and also, upon its outer side opposite said flange, a reinforcing fillet, an annular flexible shoe having oppositely extending wings adapted to engage respectively with said flanges, the outer portion of said shoe extending laterally and resting upon the respective fillets, and a tube extending between the shields within the outer circumferences thereof and being adapted to hold said wings in connected relation with said flanges when inflated, said shoe being so formed and held that its extended sides become compressed diametrically inward against said fillets when its central portion is pressed outwardly by the inflated tube.

In testimony whereof I affix my signature, in presence of two witnesses.

AMOS J. ROUSSEY.

Witnesses:
ESTHER NEIDHART,
MATHILDA METTLER.